United States Patent [19]

Hansen

[11] Patent Number: 4,917,733
[45] Date of Patent: Apr. 17, 1990

[54] POZZOLANIC MIXTURE FOR STABILIZING LANDFILL LEACHATE

[76] Inventor: David L. Hansen, P.O. Box 290, West Sand Lake, N.Y. 12196

[21] Appl. No.: 272,134

[22] Filed: Nov. 14, 1988

[51] Int. Cl.⁴ .............................................. C05F 3/00
[52] U.S. Cl. ...................................... 106/85; 106/118
[58] Field of Search .................................. 106/118, 85

[56] References Cited

U.S. PATENT DOCUMENTS

| | | |
|---|---|---|
| Re. 30,943 | 5/1982 | Nicholson . |
| 4,028,130 | 6/1977 | Webster et al. . |
| 4,038,095 | 7/1977 | Nicholson . |
| 4,044,695 | 8/1977 | MacKenzie et al. ....... 241/DIG. 38 |
| 4,081,285 | 3/1978 | Pennell ................................ 106/100 |
| 4,101,332 | 7/1978 | Nicholson . |
| 4,226,630 | 10/1980 | Styron . |
| 4,274,880 | 6/1981 | Chappell . |
| 4,373,958 | 2/1983 | Jones et al. ......................... 106/118 |
| 4,375,986 | 3/1983 | Pichat . |
| 4,432,800 | 2/1984 | Kneller et al. . |
| 4,613,374 | 9/1986 | Smith ................................. 106/118 |
| 4,617,045 | 10/1986 | Bronshtein ......................... 501/155 |
| 4,624,711 | 11/1986 | Styron ........................... 106/DIG. 1 |
| 4,669,397 | 6/1987 | Galgana et al. . |
| 4,678,514 | 7/1987 | Deyhle et al. ...................... 106/103 |
| 4,720,295 | 1/1988 | Bronshtein ......................... 501/155 |
| 4,741,782 | 5/1988 | Styron .................................. 106/97 |

Primary Examiner—Brian E. Hearn
Assistant Examiner—A. Griffis
Attorney, Agent, or Firm—Hoffmann & Baron

[57] ABSTRACT

A pozzolanic mixture for stabilizing landfill leachate which includes fly ash with an excess of lime, kiln dust, and optionally bottom ash, which is combined with the landfill leachate with a makeup quantity of water to produce a stable cementitious pozzolanic mixture that hardens to a mortar-like material. The hardened material exhibits favorable handling characteristics, and resists leaching of its environmentally hazardous components.

20 Claims, No Drawings

POZZOLANIC MIXTURE FOR STABILIZING LANDFILL LEACHATE

BACKGROUND OF THE INVENTION

I. Field of the Invention

This invention relates to pozzolanic mixtures for the stabilization and disposal of landfill leachate.

II. Background of the Related Art

Landfill leachate contains toxic and other water soluble contaminants from residential and commercial waste disposal. Landfill leachate also contains non-aqueous contaminants suspended or mixed with the water soluble contaminants. Leachate can percolate through the subsoil of the landfill and contaminate the water supply of surrounding communities.

Kiln dust is a fine powdery waste product often derived from the manufacture of portland cement in cement kilns. Kiln dust is difficult to handle at disposal facilities and can not be reused in wet process cement processing plants.

The solid wastes collected from residential and commercial sources can be used as fuel in power boilers or incinerators. The burning of this waste produces fly ash, a fine airborne particulate commonly collected from the product of the combustion stream using smoke stack scrubbers with electrostatic precipitators, baghouses and other conventional smoke stack scrubbing operations. Often fly ash may contain a certain amount of excess lime which is added during the dry scrubbing process. The burning of waste also leaves a solid residue in the form of granular, random-size free flowing bottom ash, which remains in the bottom of the incinerators or power boilers after combustion is complete.

Both bottom ash and fly ash contain toxic metals and other materials which by themselves present environmental and health hazards. Fly ash typically contains lead, chromium and cadmium, along with other hazardous metals. Bottom ash often contains lead, ferrous metals, chromium and cadmium. Typically, landfill leachate contains various organic compounds, biological contaminants, suspended petroleum products, mercury, and other hazardous metals.

The non-metallic components in bottom ash are suitable for use as a lightweight aggregate substitute in making concrete and like products in the construction industry. Thus, there are significant economic advantages to be derived from the recovery of the granular bottom ash materials from the incineration residue. In addition, the non-metallic recoverables of bottom ash can be used to dilute the environmentally hazardous fly ash for disposal in landfill operations. Methods for recovery of useful materials from refuse bottom ash are disclosed in U.S. Pat. No. 4,669,397, the contents of which are incorporated herein by reference.

U.S. Pat. Nos. 4,274,880 and 4,226,630 disclose means for disposing of hazardous liquid wastes in combination with fly ash. Neither of these references discloses or suggests the use of kiln dust, fly ash and the optional inclusion of bottom ash for the disposal of hazardous liquids. In addition, neither of these patents disclose or suggest that such a cementitious mixture may be combined to dispose of landfill leachate Specifically, U.S. Pat. No. 4,226,630 is directed towards the disposal of water-borne heavy metal sludge produced in metal processing and refining plants, by combining the sludge with a very specific type of fly ash formed through the combustion of sub-bituminous coal which is only mined in the "Powder River Basin" of Gillette, Wyoming.

U.S. Pat. No. 4,375,986 discloses the combination of waste water which has a pH not greater than 2, fly ash, and lime ($Ca(OH)_2$), Portland cement, "ground blast furnace slag", or slag cement. However, it does not disclose nor suggest the novel combination of landfill leachate, fly ash and kiln dust to form a pozzolanic mixture U.S. Pat. No. 4,028,130 is directed towards the disposal of digested sewage sludge by combining it with lime or its equivalent of lime dust or cement kiln dust, with fly ash and sufficient water. The disposal of landfill leachate is nowhere taught nor suggested in U.S. Pat. No. 4,028,130.

U.S. Pat. No. 4,101,332 reissued as Re 30,943 is directed towards a mixture of fly ash, cement kiln dust and water to produce a durable mass which is capable of supporting surfacing as pavement bases. There is no disclosure or suggestion in this patent for using any of these components to stabilize landfill leachate. U.S. Pat. No. 4,018,617, which was based on the same application as Re 30,943 is directed towards a mixture of fly ash or a pozzolan (to the exclusion of lime), cement kiln dust and aggregate to produce a hard, strong, durable mass for pavement-like surfacing. The disclosure does not suggest the use of such a mixture for stabilizing landfill leachate and requires a large proportion of aggregate.

U.S. Pat. No. 4,038,095 is also based on the same patent application as Re 30,943, but is directed toward a mixture or method for making a mixture for pavement bases and the like utilizing fly ash, lime stack dust and aggregate. It does not, however, disclose the use of this mixture for the stabilization of landfill leachate.

Lastly, U.S. Pat. No. 4,432,800 is directed towards the treatment of kiln dust used in pozzolanic reactions with calcium oxide, calcium hydroxide or sodium hydroxide. The treated kiln dust is used with a pozzolan such as fly ash and a filler to produce a durable mass. There is no disclosure or suggestion in U.S. Pat. No. 4,432,800 for using such a mixture for the stabilization of landfill leachate. Nor is the optional use of bottom ash disclosed.

Accordingly, the related art does not hitherto disclose or suggest any mixture or method useful for the stabilization and disposal of landfill leachate.

It is an object of this invention to provide a method and pozzolanic mixture which chemically converts to a strong, hard and durable mass with favorable handling and leaching characteristics.

Another object of this invention is to permanently stabilize hazardous materials contained in landfill leachate, as well as similarly stabilize the other hazardous components of the fly ash, kiln dust and bottom ash mixture.

SUMMARY OF THE INVENTION

In view of the need for a safe means for disposing of landfill leachate, fly ash, kiln dust and bottom ash the present invention provides a pozzolanic mixture which includes fly ash with an excess of lime, kiln dust, and optionally bottom ash, which is combined with the landfill leachate with a makeup quantity of water to produce a stable cementitious pozzolanic mixture that hardens to a mortar-like material. The hardened material exhibits favorable handling characteristics, and resists leaching of its hazardous components. For a better understanding of the present invention, reference is made the following description, the scope of which is defined by the claims.

DETAILED DESCRIPTION OF THE INVENTION

In accordance with the present invention, a pozzolanic mixture is produced by combining lime enriched fly ash with kiln dust, landfill leachate, and optionally, bottom ash.

The appropriate ranges of these components is fly ash - from about 15% to 45% by weight; kiln dust - from about 15% to 45% by weight; landfill leachate (with a makeup quantity of water) - from about 17% to 40% by weight; and, optionally bottom ash up to about 50% by weight. A mixture of 17.6: 17.6: 17.6: and 47.2% by weight, respectfully, is preferred. Other preferred combinations include mixtures of 11.7: 23.6: 17.6 and 47.1% by weight, respectively, or 44: 22: 34: 0(no bottom ash), respectively. The preferred fly ash contains excess lime from about 2% to 8% by weight as a result of the dry scrubbing process; more preferably from about 5% to about 8% lime by weight. If, however, an insufficient quantity of lime is present in the fly ash, excess lime may be added to the mixture in order to further stabilize the pozzolanic reaction. The hydration of the lime together with the kiln dust and the naturally pozzolanic fly ash results in a mortar-like hardening of the cured material which provides a hard, strong and leach-resistant body.

Typically, landfill leachate is collected from the bottom of lined landfill cells and kept in a holding tank for disposal. Prior to disposal kiln dust and fly ash are usually maintained in silos whereas bottom ash is often stored in a bunker which acts as a surge storage mechanism. The mixture can be combined in a pugmill, a device commonly used for mixing mortar which includes a vessel with twin counter-rotating mixing shafts, which can be installed beneath the silos. If bottom ash or other aggregate is used, then the mixture can be mixed in a typical cement mixing truck. The cementitious mixture can then be transported from the pugmill to dump trailers, or to cement mixing trucks for further mixture, and driven to any desired disposal site. Once hardened by pozzolanic reaction, the cementitious mixture converts to a hard concrete-like mass which resists the leaching of its toxic components even if subsequently crushed to sand sized particles.

The United States Environmental Protection Agency (USEPA) has promulgated rules which define "Hazardous Waste". These rules specify the maximum permissible concentrations of a number of contaminants, for example, Table 1 shows the USEPA maximum permissible non-hazardous leachate concentrations of several contaminants set forth in the Federal Register, 50, (114), pages 21649–21693 (1986), and 40 C.F.R. part 261 entitled "Identification and Listing of Hazardous Waste" at Section 261.24. The concentrations referred to are in the liquid produced by a standardized leaching procedure known as the Extraction Procedure Toxicity Test (EP Tox).

TABLE 1

MAXIMUM CONCENTRATION OF CONTAMINANTS FOR CHARACTERISTIC OF EP TOXICITY

| EPA hazardous waste number | Contaminant | Maximum Concentration (milligrams per liter) |
| --- | --- | --- |
| D004 | Arsenic | 5.0 |
| D005 | Barium | 100.0 |
| D006 | Cadmium | 1.0 |
| D007 | Chromium | 5.0 |
| D008 | Lead | 5.0 |
| D009 | Mercury | 0.2 |
| D010 | Selenium | 1.0 |
| D011 | Silver | 5.0 |
| D012 | Endrin (1,2,3,4,10,10-hexachloro-1,7-epoxy-1,4,4a,5,6,7,8,8a-octahydro-1,4-endo, endo-5, 8-dimethano naphthalene | 0.02 |
| D013 | Lindane (1,2,3,4,5,6-hexachlorocyclohexane, gamma isomer | 0.4 |
| D014 | Methoxyclor (1,1,1-Trichloro-2,2-bis [p-methoxyphenyl]ethane) | 10.0 |
| D015 | Toxaphene ($C_{10}H_{10}Cl_6$, Technical chlorinated camphene, 67–69 percent chlorine) | 0.5 |
| D016 | 2,4-D, (2,4-Dichlorophenoxyacetic acid) | 10.0 |
| D017 | 2,4,5-TP Silvex (2,4,5-Trichlorophenoxyproprionic acid) | 1.0 |

Three good indicia of toxicity in the extract from the EP Tox test are: cadmium: 1.0 mg/l maximum permissible leachate concentration allowed by the USEPA; chromium: 5.0 mg/l maximum permissible leachate concentration allowed by the EPA; and, lead: 5.0 mg maximum permissible concentration allowed by the EPA.

The testing of samples described in the following examples was performed by personnel at the State University of New York at Syracuse, when using the TCLP procedure described below; and, by the Adirondack Environmental Services, Inc. in Rensselaer, New York, a state certified, independent testing laboratory which specializes in hazardous waste and petroleum product analysis, when using the EP Tox test. The two tests performed, the Extraction Procedure Toxicity Test (EP Tox), and the Toxicity Characteristic Leaching Procedure (TCLP), are performed in order "to determine whether a waste, if mismanaged, has the potential to pose a significant hazard to human health or environment due to its propensity to leach toxic compounds. The worst case scenario selected for the TCLP, as well as for the current EP Tox is co-disposal of hazardous wastes with municipal waste in a sanitary landfill." Federal Register. supra.

The greatest difference between the EP Tox and the TCLP is the extraction procedure, summarized in Table 2:

TABLE 2

| Test | Solvent | Extraction Time | Water to Solid Ratio | Monitoring |
|---|---|---|---|---|
| EP Tox | Acetic Acid | 24 hours | 16:1 | Continuous |
| TCLP | Acetic NaOH* | 18 hours | 20:1 | Minimal |

*The Extraction Solvent used depends upon the pH of the material being analyzed. See Federal Register, supra, at page 21687, Sections 7.12.3 and 7.12.4.

Other differences between the EP Tox and the TCLP include the addition of (38) organic and inorganic compounds to the list of (14) Toxicity characteristic contaminants which are tested in the EP Tox. As more chemicals are found to be hazardous to human health, the list is likely to be further expanded. In addition, the agitation apparatus used in testing has been adjusted and augmented to increase the repeatability and precision of the test between various labs and batches. Only one shaker (instead of three used in EP Tox) has been designated. This agitation device adheres to ASTM D3987. Also, to get a more precise value on volatile organics, the Zero-Headspace Extraction Vessel has been developed. This vessel allows 25 grams of waste to be analyzed without releasing most of its volatile components. This device is compatible with general laboratory equipment and is easy to handle. Other minor changes have been made to increase precision. Waste materials which adhere to the side walls of containers is accounted for and glass filters are specified in order to decrease organic contamination and facilitate drainage.

In addition, unlike the EP Tox, which will allows the samples to remain whole, the TCLP requires all solid samples to pass through a 9.5 mm sieve, or have a surface-area-gram of material equal to a greater than 3.1 cm. Also, the TCLP addresses exhaustion of the alkalinity of a waste over a long period of leaching. Two different leachates are used depending upon the alkalinity of the waste to be tested.

Other changes not mentioned above, include: a new method of determining Chronic Toxicity Reference Levels. This "new approach uses chronic toxicity reference levels, combined with a compound specific dilution/attenuation factor, to calculate regulatory level concentrations for individual toxicants." *Federal Register, supra.*

EXAMPLES

EXAMPLES 1 AND 2 - INITIAL LABORATORY TESTING

Initial laboratory tests of the present invention utilizing fly ash obtained from the Albany, New York Solid Waste Energy Recovery System ("ANSWERS") refuse derived fuel recovery plant, Albany, New York, mixed with cement kiln dust from two sources, New Lime/K, Reclamation Systems, Inc., Ravena, New York, and Independent Cement Corp., Catskill, New York. The dry powders were mixed with water and allowed to cure for various periods of time. The procedure includes the weighing of the specific quantities of fly ash, kiln dust and water and then mixing the ingredients in the specified proportions. Observation of the workability and physical characteristics of the mixture were then made. These samples were allowed to cure for approximately ninety (90) days. The physical appearance of the cured mass was similar to Portland Cement concrete. Samples were then crushed to a sandy particle size and subjected to both EP Tox and TCLP testing. The results of these tests are summarized on Tables 3 and 4.

TABLE 3

RESULTS OF TESTS ON ANSWERS FLY ASH AND BOTTOM ASH FOR METALS BY TCLP AND BULK ANALYSIS
Concentration in ppm

| Contaminant | USEPA Max Permissible Concentration | TCLP Samples mg/l | | | | | | | Bulk Chemical Analysis Samples mg/kg | | |
|---|---|---|---|---|---|---|---|---|---|---|---|
| | | (1) | (2) | (3) | (4) | (5) | (6) | (7) | (7) | (8) | (9) |
| Cadmium | 1.0 mg/l | 0.05 | 0.05 | 0.11 | 0.28 | 0.49 | * | 3.30 | 44.87 | 13.63 | 7.02 |
| Chromium | 5.0 mg/l | * | * | * | * | * | 0.12 | * | 13.00 | 0.00 | 29.00 |
| Lead | 5.0 mg/l | 0.30 | 0.30 | 0.45 | 0.75 | 0.87 | 0.23 | 4.40 | 896.60 | 78.35 | 3304.60 |

Description of Samples
% By Weight

| Sample # | % Fly Ash | % Kiln Dust | % Bottom Ash | % Water | Observations |
|---|---|---|---|---|---|
| (1) | 17.6 | 17.6 | 47.2 | 17.6 | Good mortar-like consistency, appears stiff but workable, water rises to top. |
| (2) | 35.7 | 35.7 | 0.0 | 28.6 | Workable, but a bit stiff, water rises to top. |
| (3) | 11.7 | 23.6 | 47.1 | 17.6 | Good mortar-like consistency, good workable concrete. |
| (4) | 44.0 | 22.0 | 0.0 | 34.0 | Stiff mortar, too stiff to pour out of truck, but workable |
| (5) | 23.8 | 0.0 | 59.5 | 16.7 | Good workable mixture. |
| (6) | 0.0 | 44.4 | 22.2 | 33.4 | Soupy slurry, would flow well, but is too wet. |
| (7) | 100.0 | 0.0 | 0.0 | 0.0 | |
| (8) | 0.0 | 100.0 | 0.0 | 0.0 | |
| (9) | 0.0 | 0.0 | 100.0 | 0.0 | |

*Below detection limits, <0.01 mg/l

TABLE 4

RESULTS OF TESTS ON ANSWERS FLY ASH AND BOTTOM ASH FOR METALS BY EP TOXICITY
Concentration in ppm

| Contaminant | USEPA Max Permissible Concentration | EP Toxicity Samples mg/l | | | | | | | Bulk Chemical Analysis Samples mg/kg | | |
|---|---|---|---|---|---|---|---|---|---|---|---|
| | | (1) | (2) | (3) | (4) | (5) | (6) | (7) | (7) | (8) | (9) |
| Cadmium | 1.0 mg/l | N/A | 0.04 | N/A | 0.12 | N/A | N/A | 2.33 | 44.87 | 13.63 | 7.02 |
| Chromium | 5.0 mg/l | N/A | * | N/A | * | N/A | N/A | 0.10 | 13.00 | 0.00 | 29.00 |
| Lead | 5.0 mg/l | N/A | 0.19 | N/A | 0.22 | N/A | N/A | 38.20 | 896.60 | 78.35 | 3304 |

Description of Samples

| Sample # | % Fly Ash | % Kiln Dust | % Bottom Ash | % Water | Observations |
|---|---|---|---|---|---|
| (1) | 17.6 | 17.6 | 47.2 | 17.6 | Good mortar-like consistency, appears stiff but workable, water rises to top. |
| (2) | 35.7 | 35.7 | 0.0 | 28.6 | Workable, a bit stiff, water rises to top. |
| (3) | 11.7 | 23.6 | 47.1 | 17.6 | Good mortar-like consistency, good workable concrete. |
| (4) | 44.0 | 22.0 | 0.0 | 34.0 | Stiff mortar, too stiff to pour out of truck, but workable. |
| (5) | 23.8 | 0.0 | 59.5 | 16.7 | Good workable mixture. |
| (6) | 0.0 | 44.4 | 22.2 | 33.4 | Soupy slurry, would flow well, but it is too wet. |
| (7) | 100.0 | 0.0 | 0.0 | 0.0 | |
| (8) | 0.0 | 100.0 | 0.0 | 0.0 | |
| (9) | 0.0 | 0.0 | 100.0 | 0.0 | |

*Below detection limits, <0.05 mg/l (N/A - samples (1), (3), (5) and (6) were not tested by EP Tox.)

EXAMPLES 3 AND 4 - INCORPORATING LANDFILL LEACHATE

Additional samples were prepared as described in Examples and 1 and 2, but instead of water these samples utilized landfill leachate from a Plainville, Massachusetts landfill. Some of the samples were placed into an extractor within thirty (30) minutes of mixing, simulating the performance of the materials at the time of landfill placement. The results of the EP Tox tests for these samples (1A–1D) are shown in Table 5. Other samples were allowed to cure for seventeen (17) days, and then crushed to a powder and extracted. The results of EP Tox tests for these samples (2A–2D) are shown in Table 6.

TABLE 5

RESULTS OF TESTS ON STABILIZED PLAINVILLE LEACHATE AND ANSWERS FLY ASH FOR METALS BY EP TOXICITY
30 Minute Mix
Concentration in ppm

| Contaminant | USEPA Max Permissible Concentration | EP Toxicity Samples mg/l | | | | | Bulk Chemical Analysis Samples mg/kg | | | |
|---|---|---|---|---|---|---|---|---|---|---|
| | | (1A) | (1B) | (1C) | (1D) | (5) | (5) | (6) | (7) | (8) |
| Cadmium | 1.0 mg/l | 0.17 | 0.18 | 0.11 | 0.13 | 2.33 | 44.87 | 13.63 | 0.06 | <0.04 |
| Chromium | 5.0 mg/l | * | * | * | * | 0.10 | 13.00 | 0.00 | 0.23 | 0.13 |
| Lead | 5.0 mg/l | 0.45 | 0.48 | 0.24 | 0.29 | 38.20 | 896.60 | 78.35 | 1.09 | 0.33 |

Description of Samples

| Sample # | % Fly Ash | % Kiln Dust | % Old Leachate | % New Leachate |
|---|---|---|---|---|
| (1A) | 34 | 34 | 0 | 32 |
| (1B) | 34 | 34 | 32 | 0 |
| (1C) | 44 | 22 | 0 | 34 |
| (1D) | 44 | 22 | 34 | 0 |
| (5) | 100.0 | 0 | 0 | 0 |
| (6) | 0 | 100.0 | 0 | 0 |
| (7) | 0 | 0 | 100 | 0 |
| (8) | 0 | 0 | 0 | 100 |

*Below detection limits, <0.05 mg/l

TABLE 6

RESULTS OF TESTS ON STABILIZED PLAINVILLE LEACHATE AND ANSWERS FLY ASH FOR METALS BY EP TOXICITY
17 Day Cure
Concentration in ppm

| Contaminant | USEPA Max Permissible Concentration | EP Toxicity Samples mg/l | | | | | Bulk Chemical Analysis Samples mg/kg | | | |
|---|---|---|---|---|---|---|---|---|---|---|
| | | (2A) | (2B) | (2C) | (2D) | (5) | (5) | (6) | (7) | (8) |
| Cadmium | 1.0 mg/l | * | * | * | 0.05 | 2.33 | 44.87 | 13.63 | 0.06 | <0.04 |
| Chromium | 5.0 mg/l | * | * | * | * | 0.10 | 13.00 | 0.00 | 0.23 | 0.13 |

TABLE 6-continued
RESULTS OF TESTS ON STABILIZED PLAINVILLE LEACHATE AND ANSWERS FLY ASH FOR METALS BY EP TOXICITY
17 Day Cure
Concentration in ppm

| Lead | 5.0 mg/l | <0.10 | <0.10 | <0.10 | 0.10 | 38.20 | 896.60 | 78.35 | 1.09 | 0.33 |
|---|---|---|---|---|---|---|---|---|---|---|

Description of Samples
% By Weight

| Sample # | % Fly Ash | Kiln Dust | % Old Leachate | New Leachate |
|---|---|---|---|---|
| (2A) | 34 | 34 | 0 | 32 |
| (2B) | 34 | 34 | 32 | 0 |
| (2C) | 44 | 22 | 0 | 34 |
| (2D) | 44 | 22 | 34 | 0 |
| (5) | 100.0 | 0 | 0 | 0 |
| (6) | 0 | 100.0 | 0 | 0 |
| (7) | 0 | 0 | 100 | 0 |
| (8) | 0 | 0 | 0 | 100 |

*Below detection limits, <0.05 mg/l

When mixed, all samples (i.e., samples 1A-1D and 2A-2D) had a good mortar-like consistency which appeared slightly stiff but workable. The samples were not very fluid, however, a film of water rose to the top after the mixture settled for about thirty minutes.

Lead, cadmium and chromium are normally the metals of concern in fly ash and leachate extracts. Significant reductions in the leachability of these metals on the order of one and two orders of magnitude were observed. Thus, the data in Tables 3-6 indicates that the present invention produces very positive reductions in leachability of these metals even before the mixture is fully cured.

Full Scale Demonstration

Equipment

A full scale demonstration of the present invention employed a mobile, self-contained silo/mixer unit known as an ARAN ASR-280B manufactured in Australia by ARAN Mfg. Corp. This diesel powered unit is capable of storing up to 50 tons of kiln dust in a dust controlled silo and mixing the kiln dust in a pugmill with fly ash and leachate in controlled ratios. A rubber belt conveyor with a clam shell discharge loads the covered dump trailers for transit to the landfill.

Procedure

The fly ash/kiln dust mixture is collected by air pollution control equipment at the SEMASS waste to energy-facility in Rochester, Massachussets, and stored in a silo. The fly ash flows by gravity discharge into either of two pugmills located above a drive-thru discharge zone. The fly ash is conditioned to any desired moisture content prior to gravity discharge into the ARAN "aggregate" hopper which is positioned in the drive-thru below the fly ash discharge.

Cement kiln dust is metered onto a belt carrying the fly ash product to the mixer. Leachate and any makeup amount of water is also be added prior to the ARAN pugmill. The ARAN unit provides 2500 gallons of leachate/water storage.

The three components are intimately mixed in the pugmill and then discharged onto a rubber belt conveyor for trailer loading.

The preferred physical consistency of the finished mix is a moist silty texture, but not saturated. This mixture is not free-flowing like toothpaste or wet mortar, but rather is like a moist soil. At the landfill, a compactor immediately travels over the mixture. Some eight to ten days after compaction, the mixture hardens to a concrete like durability.

An important aspect of the full scale demonstration is the determination of the final mix ratios. The preliminary experiments, discussed above, indicate that ratios of fly ash/kiln dust/leachate of 2:1:1.7 are appropriate. Lower concentrations of kiln dust may be appropriate, however, when the fly ash contains higher concentrations of lime.

Landfill Handling During The Full Scale Demonstration

The stabilized mixture is transported in leakproof, covered dump trailers to a lined landfill facility. The stabilized mixture is dumped in the dedicated ash disposal cell. When any bottom ash is utilized, the stabilized mixture is combined with the appropriate ratio of bottom ash (up to 50%). In either case, the mixture is immediately compacted and covered with soil daily. No special handling is required.

Thus, while I have described what are presently the preferred embodiments of the present invention, other and further changes and modifications could be made thereto without departing from the scope of the invention, and it is intended by the inventor herein to claim all such changes and modifications.

I claim:

1. A pozzolanic mixture for stabilizing landfill leachate, comprising: fly ash, kiln dust, and landfill leachate which is cured to form a solid, leach-resistant body.

2. The mixture recited in claim 1, wherein the mixture further comprises bottom ash.

3. The mixture recited in claim 1, wherein said fly ash includes excess lime added during a scrubbing process.

4. The mixture recited in claim 1, wherein said components include:
   (a) fly ash in a concentration from about 15% to 45% by weight of said mixture;
   (b) kiln dust in a concentration from about 15% to 45% by weight of said mixture; and,
   (c) landfill leachate in a concentration from about 15% to 40% by weight of said mixture.

5. The mixture recited in claim 4, wherein said fly ash includes added lime in the range of about 2% to 8% by weight.

6. The mixture recited in claim 5, further comprising up to 50% by weight bottom ash.

7. The mixture recited in claim 6, wherein said remainder quantity of landfill leachate is made up from water.

8. The mixture recited in claim 7, wherein said components include:
(a) fly ash about 17.6% by weight;
(b) kiln dust about 17.6% by weight;
(c) landfill leachate about 17.6% by weight; and,
(d) bottom ash about 47.2% by weight.

9. The mixture recited in claim 7, wherein said components include:
(a) fly ash about 11.7% by weight;
(b) kiln dust about 23.6% by weight;
(c) landfill leachate about 17.6% by weight; and,
(d) bottom ash about 47.1% by weight.

10. The mixture recited in claim 7, wherein said components include:
(a) fly ash about 44% by weight;
(b) kiln dust about 22% by weight;
(c) landfill leachate 34% about by weight; and,
(d) no bottom ash.

11. A method for the disposal of landfill leachate comprising the steps of: combining fly ash, kiln dust and landfill leachate to form a pozzolanic mixture, and curing the mixture to form a solid leach-resistant body.

12. The method recited in claim 11, further comprising adding bottom ash to said pozzolanic mixture.

13. The method recited in claim 11, wherein said fly ash includes excess lime which has been added during a scrubbing process.

14. The method recited in claim 11, wherein in said steps;
(a) fly ash is added in a concentration from about 15% to 45% by weight of said mixture;
(b) kiln dust is added in a concentration from about 15% to 45% by weight of said mixture; and,
(c) landfill leachate is added in a concentration from about 17% to 40% by weight of said mixture.

15. The method recited in claim 14, wherein said fly ash includes added lime in the range of about 2% to 8% by weight.

16. The method recited in claim 15, further comprising the step of: adding up to 50% by weight bottom ash to said pozzolanic mixture.

17. The method recited in claim 16, further comprising the step of: adding water to said pozzolanic mixture to make up for any remaining quantity of landfill leachate.

18. The method recited in claim 17, wherein in said steps;
(a) fly ash is added in a concentration of about 17.6% by weight;
(b) kiln dust is added in a concentration of about 17.6% by weight;
(c) landfill leachate is added in a concentration of about 17.6% by weight; and,
(d) bottom ash is added in a concentration of about 47.2% by weight.

19. The method recited in claim 17, wherein in said steps;
(a) fly ash is added in a concentration of about 11.7% by weight;
(b) kiln dust is added in a concentration of about 23.6% by weight;
(c) landfill leachate is added in a concentration of about 7.6% by weight; and,
(d) bottom ash is added in a concentration of about 47.1% by weight.

20. The method recited in claim 17, wherein in said steps;
(a) fly ash is added in a concentration of about 44% by weight;
(b) kiln dust is added in a concentration of about 22% by weight;
(c) landfill leachate is added in a concentration of about 34% by weight; and,
(d) no bottom ash is added.

* * * * *